No. 655,924. Patented Aug. 14, 1900.
J. G. EVANS.
WEED CUTTER.
(Application filed Jan. 12, 1900.)
(No Model.) 2 Sheets—Sheet 2.
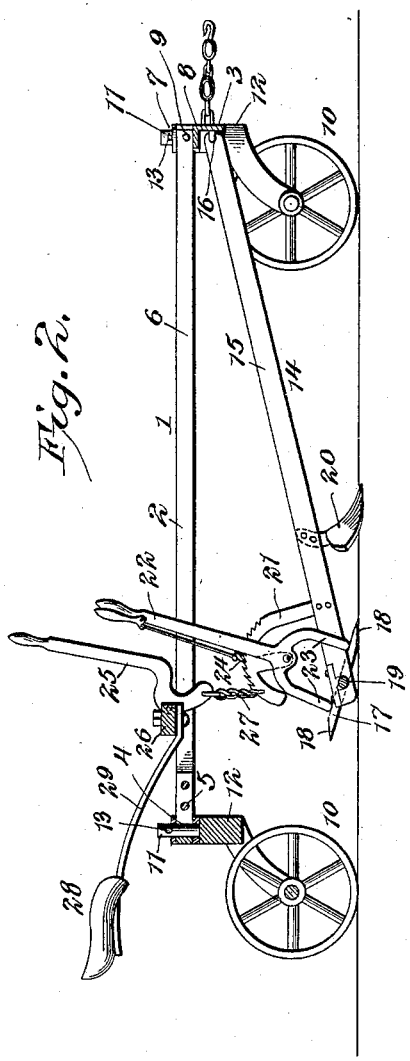
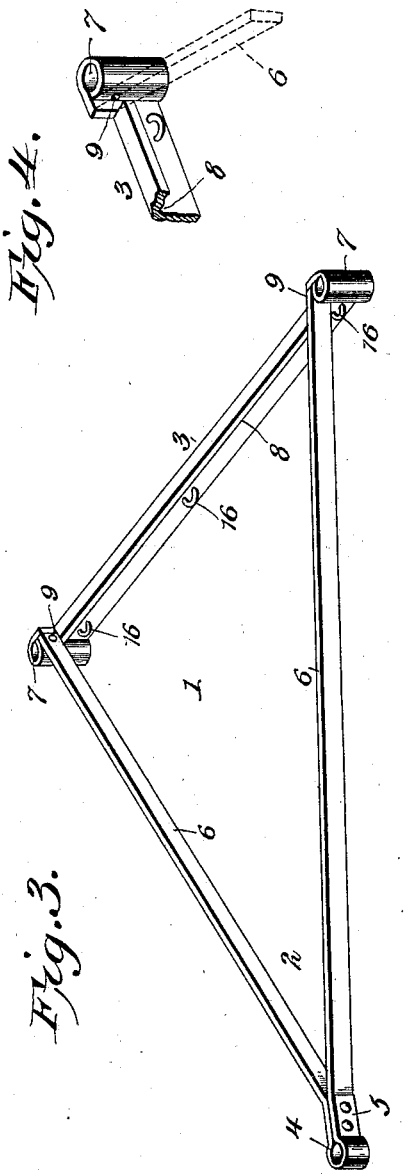
Witnesses Joseph G. Evans, Inventor,
By his Attorneys,

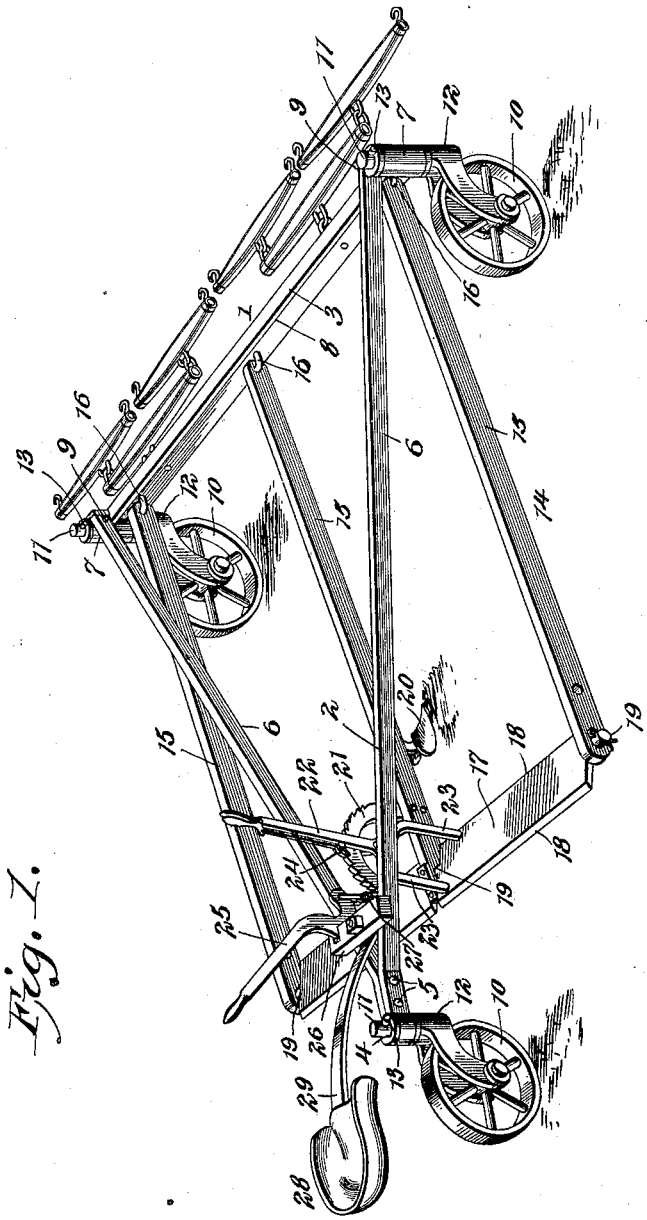

UNITED STATES PATENT OFFICE.

JOSEPH G. EVANS, OF WAITSBURG, WASHINGTON.

WEED-CUTTER.

SPECIFICATION forming part of Letters Patent No. 655,924, dated August 14, 1900.

Application filed January 12, 1900. Serial No. 1,221. (No model.)

*To all whom it may concern:*

Be it known that I, JOSEPH G. EVANS, a citizen of the United States, residing at Waitsburg, in the county of Walla Walla and State of Washington, have invented a new and useful Weed-Cutter, of which the following is a specification.

My invention is an improved weed-cutter, the object of my invention being to provide a simple, cheap, strong, durable, and highly-efficient machine especially adapted for use on fallow land to clear the same of weeds.

With this object in view my invention consists in the combination, with a supporting wheel-frame, of a vertically-movable drag-frame connected thereto and a revoluble double-edged cutter-bar pivotally mounted in said drag-frame and a locking-lever for locking and tripping said cutter-bar, whereby it may be reversed and cleared of weeds and obstructions.

My invention further consists in the peculiar construction and combination of devices hereinafter fully set forth, and particularly pointed out in the claims.

In the accompanying drawings, Figure 1 is a perspective view of a weed-cutter embodying my improvements. Fig. 2 is a vertical longitudinal central sectional view of the same. Fig. 3 is a detail perspective view of the triangular supporting-frame. Fig. 4 is an enlarged detail view of one of the corners of said frame.

In the construction of my improved weed-cutter I employ a supporting-frame 1, which is preferably composed of two bars 2 3, of iron or steel. The bar 2 is bent centrally to form a vertical bearing 4 at the rear side of the supporting-frame, the proximate portions of the said bar in advance of the said bearing being bolted together, as at 5, and the said bar diverges to form the side bars 6. The front bar 3 is curved at its ends to form the vertical bearings 7, and the portions of the said bar between the said bearings are bent at right angles in cross-section, as at 8, thereby greatly adding to the strength and rigidity of the said bar. The front ends of the side bars 6 are bolted to the vertical cylindrical portions of the bar 3, as at 9, said bars 2 and 3 thus making a frame which is triangular in form, as shown.

Caster-wheels 10, which form the supports for the frame, have the vertical spindles 11 of their bearings 12 swiveled in the vertical bearings at the corners of the frame 1 and retained therein and adapted to be detached therefrom by suitable linchpins 13. Nuts may be substituted for said linchpins, if preferred, and screwed on to the upper protruding ends of the spindles.

The drag-frame 14 is composed of three parallel bars 15, which have their front ends pivotally connected to the bar 3, as at 16. A revoluble cutter-bar 17 is provided on opposite sides with the double cutting edges 18 and has its bearings 19 at its ends and center in the rear ends of the bars 15. To the central bar 15 is attached a shovel-plow 20, which operates in advance of the central bearing of the cutter-bar, and to the said central bar 15, at a suitable distance from the central bearing of the cutter-bar, is bolted a segmental ratchet 21, which forms the bearing for a locking and tripping lever 22. Said lever is provided with the fork-arms 23, which are adapted to bear on the cutter-bar at points in front and rear of the pivotal axis thereof, and hence retain the cutter-bar in the operative position shown in Figs. 1 and 2. Said tripping and locking lever when the upper end is moved forward causes its fork-arm to move rearward on the upper side of the cutter-bar, its rearmost fork-arm clearing the rear side of the cutter-bar and its foremost fork-arm bearing down upon the same in advance of its pivotal axis, thereby tripping the cutter-bar, and as the latter is in engagement with the earth said cutter-bar partially rotates and reverses its position. A pawl 24 is pivoted to the lever 22 and engages the ratchet-segment and serves to lock the lever 22 in any desired position.

A bell-crank lever 25 is fulcrumed in a bolster 26, which is mounted on the supporting-frame, near the rear end thereof. The short arm of the lever 25 is connected to the segment-plate 21 or to any other appropriate point on the drag-frame by a link or chain 27.
The function of the lever 25 is to raise and lower the rear end of the drag-frame, carrying the cutter-bar, so that when the weed-cutter is being driven from one point to another and is not in operation the cutter-bar can be raised from operative contact with the ground. A seat 28 for the driver is supported on a spring-bar 29, that has its front end bolted to the bolster 26.

In Fig. 1 of the drawings my improved weed-cutter is shown as provided with a pair of doubletrees attached to its front side and two pairs of singletrees, thereby adapting it to be drawn by four horses. It will be readily understood, however, that the weed-cutter may be of any suitable size and adapted to be drawn by one or any number of horses, and I do not limit myself in this particular.

My improved weed-cutter is especially adapted for use on fallow land to clear the same of weeds. When the weed-cutter is in operation, the cutter-bar is supported by the lever 22 at such an angle to the earth as to cause the front cutting edge of the cutter-bar to run at a slight distance below the surface and effectually cut and clear away all weeds and other trash. When the cutter-bar becomes clogged and it is necessary to clear the same, this may be readily accomplished by operating the lever 22, so as to cause its fork-arm to trip and reverse the cutter-bar in the manner hereinbefore described. The shovel-plow 20, which operates in advance of the central pivot of the cutter-bar, clears the weeds and trash in advance of said pivotal point of the cutter-bar which would otherwise be missed.

Having thus described my invention, I claim—

1. The combination, with a supporting wheel-frame, of a vertically-movable drag-frame having a revoluble, double-edged cutter-bar, and a locking-lever for said cutter-bar, substantially as described.

2. In a weed-cutter, the combination of a supporting wheel-frame, with a drag-frame connected thereto, a revoluble, double-edged cutter-bar having pivoted supports in the drag-frame, and a locking device for said cutter-bar, substantially as described.

3. In a weed-cutter, the combination of a supporting-frame, a drag-frame, connected thereto, a revoluble, double-edged cutter-bar, pivotally supported in the drag-frame, and a locking and tripping lever, carried by the drag-frame, and adapted to trip and lock the cutter-bar, for the purpose set forth, substantially as described.

4. In a weed-cutter, the combination of a supporting-frame, a drag-frame, connected thereto, a revoluble, double-edged cutter-bar, pivotally supported in the drag-frame, a locking and tripping lever, carried by the drag-frame, and adapted to lock and trip the cutter-bar, and a lever, carried by the supporting-frame and connected to the drag-frame, to raise and lower the latter, substantially as described.

5. In a weed-cutter, a supporting-frame, having independently-pivoted supporting wheel-bearings, a drag-frame connected to said supporting-frame, and a cutter-bar carried by said drag-frame, substantially as described.

In testimony that I claim the foregoing as my own I have hereto affixed my signature in the presence of two witnesses.

JOSEPH G. EVANS.

Witnesses:
F. E. FENDER,
RICHARD H. ORMSBEE.